Patented Apr. 5, 1927.

1,623,601

UNITED STATES PATENT OFFICE.

DELOS H. SMITH, OF PORT WASHINGTON, WISCONSIN, ASSIGNOR TO SMITH BROTHERS, OF PORT WASHINGTON, WISCONSIN, A CORPORATION OF WISCONSIN.

PROCESS OF MAKING CAVIAR.

No Drawing. Application filed October 9, 1925. Serial No. 61,586.

This invention relates to a process of manufacturing caviar.

Objects of this invention are to provide a process for the manufacture of caviar which will allow the substitution of whitefish roe for the usual sturgeon roe, and which will secure the same degree of consistency and the same desirable flavors found in sturgeon caviar.

Further objects are to provide a process of manufacturing caviar which will utilize more of the material ordinarily wasted in the usual process, and which will avoid the fishy flavor which has been found when the usual processes have been followed.

It is a well known fact that the supply of sturgeon roe from which the imported caviar is made, has materially decreased and consequently this process supplies a want manifest in a marked degree.

Whitefish caviar lacks a certain "pasty" or gluey constituent which is characteristic of sturgeon caviar. My process brings out this natural caviar sauce which serves the double purpose of improving the flavor and forming a desirable matrix for the eggs which prevents them from breaking and makes them "smear" better on bread or toast. No other substance excepting this natural caviar fluid is used to get this result.

In practising this process, I preferably use whitefish roe. The roe is taken from the fish in its prime condition in the fall of the year and is carefully washed and passed through a fine screen and then salted. During this screening, a material amount of liquor is separated from the roe and it has been found that the liquor is composed primarily of juices from the breaking of a large number of eggs in the roe. The liquor is heated and stirred during the heating process and eventually turns into a jelly-like mass. During the heating process, it is important to hold the temperature at approximately 182 degrees F., which temperature, it has been found, does not injure the flavor of the product.

This caviar sauce is then added to and stirred thoroughly into the screened roe and the mixture heated to 150 degrees. (Previous to this heating process, the screened roe has been aged in wooden casks for from two to three months to be cured.)

After the caviar has been heated, it is put into cans and sealed. These cans are then placed in hot water and sterilized at from 150 degrees to 160 degrees F. for a period of not less than one hour. This temperature is carefully watched to avoid coagulating the albumen of the eggs.

It has been found from actually practicing this process that the undesirable fishy flavor is avoided and that the resulting product has a very pleasing and palatable flavor and closely resembles in appearance the imported sturgeon caviar.

It is to be noted that there are three heating processes.

First:—Caviar fluid or sauce is heated to 182 degrees F. until the fluid turns to jelly.

Second:—The jelly is added to the cured roe and mixed together in a kettle and heated until a temperature of 150 degrees is reached. The caviar is next placed in cans and the cans are then sealed.

Third:—The sealed cans are next placed in a hot water bath and pasteurized, not less than one hour, at from 150 degrees to 160 degrees F. depending on the size of the can—larger cans taking longer to heat through.

It will be seen that a process of manufacturing caviar has been provided which may be expeditiously followed, which avoids the usual waste, which provides a matrix for holding the eggs of the roe in position, and which avoids the undesirable fishy flavor.

I claim:

1. The process of manufacturing caviar comprising passing fish roe through a screen, separating the liquid resulting during this screening from the roe, curing the roe, heating the liquid, and adding such liquid to the roe.

2. The process of manufacturing caviar comprising screening fish roe, separating the resulting liquid from the roe, packing the roe in casks, curing the roe, heating and stirring the liquid and adding it to the cured roe, sealing the roe in cans, and Pasteurizing the sealed caviar at from 150 to 160 degrees F.

3. The process of manufacturing caviar comprising passing the roe of whitefish through a screen, separating the liquid resulting from screening, washing, salting, and packing the roe in casks, curing the roe, heating the liquid to approximately 182 degrees F. and stirring such liquid during heating, adding the liquid to the cured roe, sealing the cured roe in cans, and subjecting the cans to a temperature of approximately 150 degrees to 160 degrees F.

4. The process of manufacturing caviar comprising screening fish roe to allow the passage through the screen only of the roe and the juice from broken eggs, discarding the material left on the screen, separating the eggs from the liquid in the screened material, heating the liquid to approximately 182° F., curing the roe, adding the liquid to the roe and intimately mixing to cause the roe to become fixed in a jelly-like matrix, sealing the mass in cans, and sterilizing the cans.

In testimony that I claim the foregoing I have hereunto set my hand at Port Washington, in the county of Ozaukee and State of Wisconsin.

DELOS H. SMITH.